United States Patent
Ulichney et al.

(10) Patent No.: US 7,453,449 B2
(45) Date of Patent: Nov. 18, 2008

(54) SYSTEM AND METHOD FOR CORRECTING DEFECTIVE PIXELS OF A DISPLAY DEVICE

(75) Inventors: Robert A. Ulichney, Stow, MA (US); Niranjan Damera-Venkata, Mountain View, CA (US); Daniel R. Tretter, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 812 days.

(21) Appl. No.: 10/947,762

(22) Filed: Sep. 23, 2004

(65) Prior Publication Data

US 2006/0061604 A1 Mar. 23, 2006

(51) Int. Cl.
*G06F 3/038* (2006.01)
(52) U.S. Cl. .................................. 345/204; 345/691
(58) Field of Classification Search .............. 345/84.89, 345/690, 691, 694
See application file for complete search history.

(56) References Cited

U.S. PATENT DOCUMENTS

| | | | |
|---|---|---|---|
| 4,373,784 A | 2/1983 | Nonomura et al. | |
| 4,662,746 A | 5/1987 | Hornbeck | |
| 4,811,003 A | 3/1989 | Strathman et al. | |
| 4,956,619 A | 9/1990 | Hornbeck | |
| 5,061,049 A | 10/1991 | Hornbeck | |
| 5,083,857 A | 1/1992 | Hornbeck | |
| 5,146,356 A | 9/1992 | Carlson | |
| 5,317,409 A | 5/1994 | Macocs | |
| 5,386,253 A | 1/1995 | Fielding | |
| 5,490,009 A | 2/1996 | Venkateswar et al. | |
| 5,557,353 A | 9/1996 | Stahl | |
| 5,689,283 A * | 11/1997 | Shirochi | 345/698 |
| 5,828,793 A * | 10/1998 | Mann | 382/284 |
| 5,912,773 A | 6/1999 | Barnett et al. | |
| 5,920,365 A | 7/1999 | Eriksson | |
| 5,953,148 A | 9/1999 | Moseley et al. | |
| 5,978,518 A | 11/1999 | Oliyide et al. | |
| 6,025,951 A | 2/2000 | Swart et al. | |

(Continued)

FOREIGN PATENT DOCUMENTS

EP 1001306 A2 5/2000

(Continued)

OTHER PUBLICATIONS

L.M. Chen and S. Hasagawa, "Visual Resolution Limits for Color Matrix Displays", "One Panel Projectors" Displays, Technologies, and Applications, vol. 13, pp. 221-226, 1992.

(Continued)

*Primary Examiner*—Richard Hjerpe
*Assistant Examiner*—Shaheda A Abdin

(57) ABSTRACT

A method of displaying an image with a display device having a plurality of defective pixels is provided. The method comprises selecting an offset between a first sub-frame and a second sub-frame using information associated with the plurality of defective pixels, generating the first sub-frame and the second sub-frame using image data for the image, adjusting a first sub-frame pixel value in the first sub-frame associated with one of the plurality of defective pixels, and alternating between displaying the first sub-frame in a first position and displaying the second sub-frame in a second position, the second position displaced from the first position by an amount defined by the offset.

29 Claims, 9 Drawing Sheets

U.S. PATENT DOCUMENTS

| | | |
|---|---|---|
| 6,067,143 A | 5/2000 | Tomita |
| 6,104,375 A | 8/2000 | Lam |
| 6,118,584 A | 9/2000 | Van Berkel et al. |
| 6,141,039 A | 10/2000 | Poetsch |
| 6,184,969 B1 | 2/2001 | Fergason |
| 6,219,017 B1 | 4/2001 | Shimada et al. |
| 6,239,783 B1 | 5/2001 | Hill et al. |
| 6,243,055 B1 | 6/2001 | Fergason |
| 6,313,888 B1 | 11/2001 | Tabata |
| 6,384,816 B1 | 5/2002 | Tabata |
| 6,393,145 B2 | 5/2002 | Betrisey et al. |
| 6,522,356 B1 | 2/2003 | Watanabe |
| 6,657,603 B1 | 12/2003 | Demetrescu et al. |
| 2003/0020809 A1 | 1/2003 | Gibbon et al. |
| 2003/0076325 A1 | 4/2003 | Thrasher |
| 2003/0090597 A1 | 5/2003 | Katoh et al. |
| 2004/0027363 A1* | 2/2004 | Allen .................. 345/698 |

FOREIGN PATENT DOCUMENTS

| | | |
|---|---|---|
| EP | 1388839 | 2/2004 |
| EP | 1388840 | 2/2004 |
| EP | 1553548 | 7/2005 |

OTHER PUBLICATIONS

A. Yasuda et al., "FLC Wobbling for High-Resolution Projectors", Journal of the SID May 3, 1997, pp. 299-305.

T. Tokita, et al., "P-108: FLC Resolution-Enhancing Device for Projection Displays", SID 02 Digest 2002, pp. 638-641.

D.H. Kelly, "Motion and Vision—II. Stabilized Spatio-Temporal Threshold Surface," Journal of the Optical Society of America, vol. 69, No. 10, Oct. 1979.

Candice H. Brown Elliot et al., "Color Subpixel Rendering Projectors and Flat Panel Displays"; SMPTE Advanced Motion Imaging Conference; Feb. 27-Mar. 1, 2003; pp. 1-4.

Diana C. Chen, "Display Resolution Enhancement with Optical Scanners" Applied Optics, vol. 40, No. 5, Feb. 10, 2001, pp. 636-643.

* cited by examiner

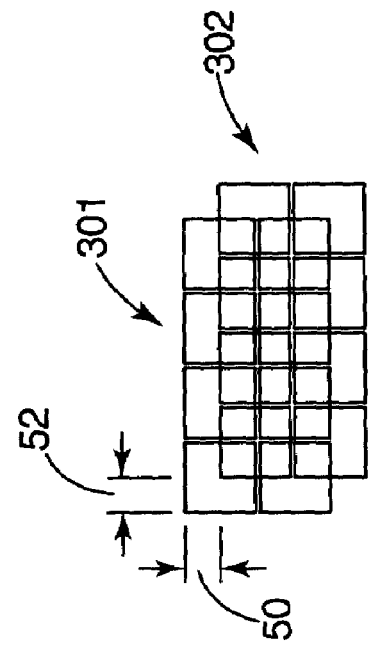
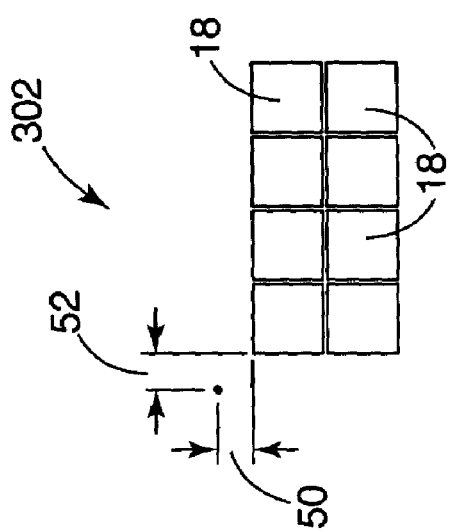
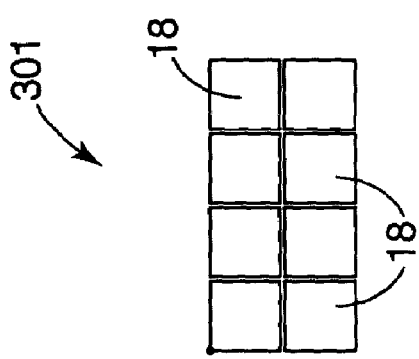

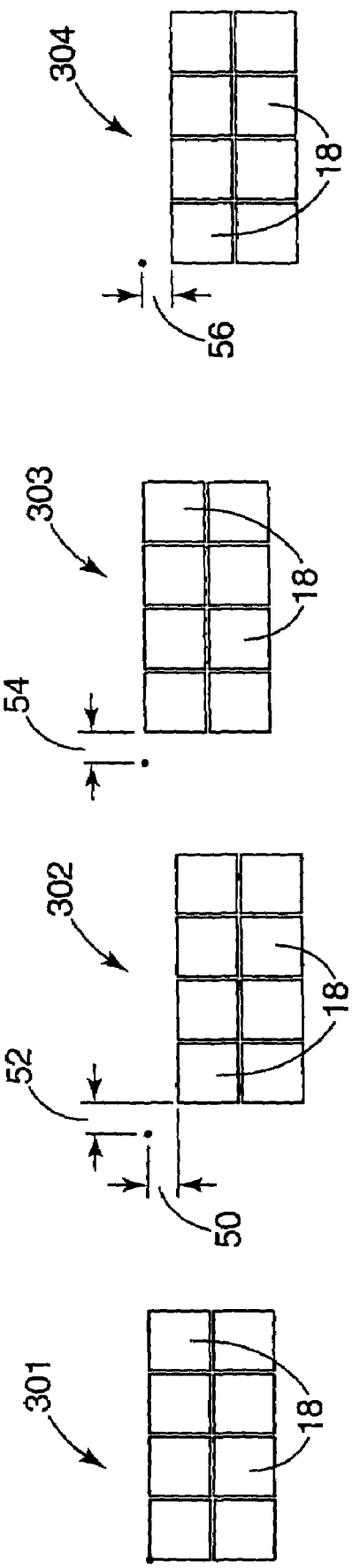
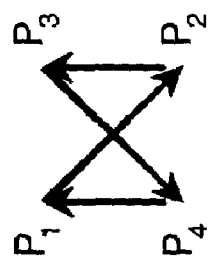
Fig. 3A  Fig. 3B  Fig. 3C  Fig. 3D  Fig. 3E

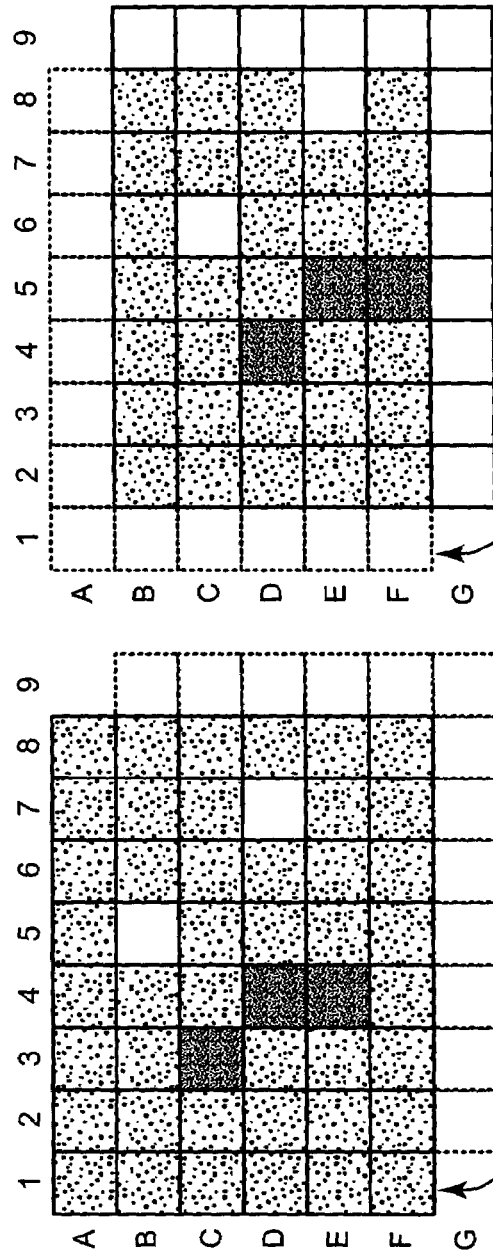
Fig. 5A
Fig. 5B
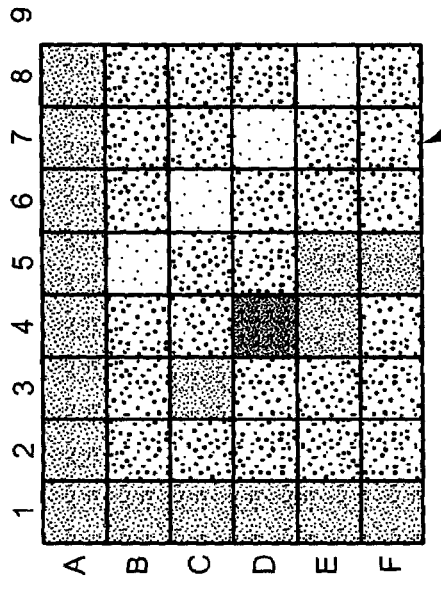
Fig. 5C

| 13 | 11 | 8 | 5 | 8 | 11 | 13 |
|---|---|---|---|---|---|---|
| 12 | 9 | 6 | 3 | 6 | 9 | 12 |
| 10 | 7 | 4 | 1 | 4 | 7 | 10 |
| 8 | 5 | 2 |  | 2 | 5 | 8 |
| 10 | 7 | 4 | 1 | 4 | 7 | 10 |
| 12 | 9 | 6 | 3 | 6 | 9 | 12 |
| 13 | 11 | 8 | 5 | 8 | 11 | 13 |

3:2 ASPECT RATIO — 406

Fig. 6C

| 15 | 13 | 9 | 5 | 9 | 13 | 15 |
|---|---|---|---|---|---|---|
| 14 | 11 | 7 | 3 | 7 | 11 | 14 |
| 12 | 8 | 4 | 1 | 4 | 8 | 12 |
| 10 | 6 | 2 |  | 2 | 6 | 10 |
| 12 | 8 | 4 | 1 | 4 | 8 | 12 |
| 14 | 11 | 7 | 3 | 7 | 11 | 14 |
| 15 | 13 | 9 | 5 | 9 | 13 | 15 |

16:9 ASPECT RATIO — 404

Fig. 6B

| 15 | 13 | 10 | 6 | 10 | 13 | 15 |
|---|---|---|---|---|---|---|
| 14 | 11 | 7 | 3 | 7 | 11 | 14 |
| 12 | 8 | 4 | 1 | 4 | 8 | 12 |
| 9 | 5 | 2 |  | 2 | 5 | 9 |
| 12 | 8 | 4 | 1 | 4 | 8 | 12 |
| 14 | 11 | 7 | 3 | 7 | 11 | 14 |
| 15 | 13 | 10 | 6 | 10 | 13 | 15 |

4:3 ASPECT RATIO — 402

Fig. 6A

| $D_s$ | H | $L_s$ |
|---|---|---|
| $C_s$ | $G_s$ | K |
| $B_s$ | F | $J_s$ |
| $A_s$ | $E_s$ | $I_s$ |

— 14

=

| D | H | L |
|---|---|---|
| C | G | K |
| B | F | J |
| A | E | I |

— 28

|  | H |  |
|---|---|---|
|  | $G_2$ | K |
| F | $J_2$ |  |

30B — 452, 454, 456

(½)

+

| $D_1$ | H | $L_1$ |
|---|---|---|
| $C_1$ |  | K |
| $B_1$ | F |  |
| $A_1$ | $E_1$ | $I_1$ |

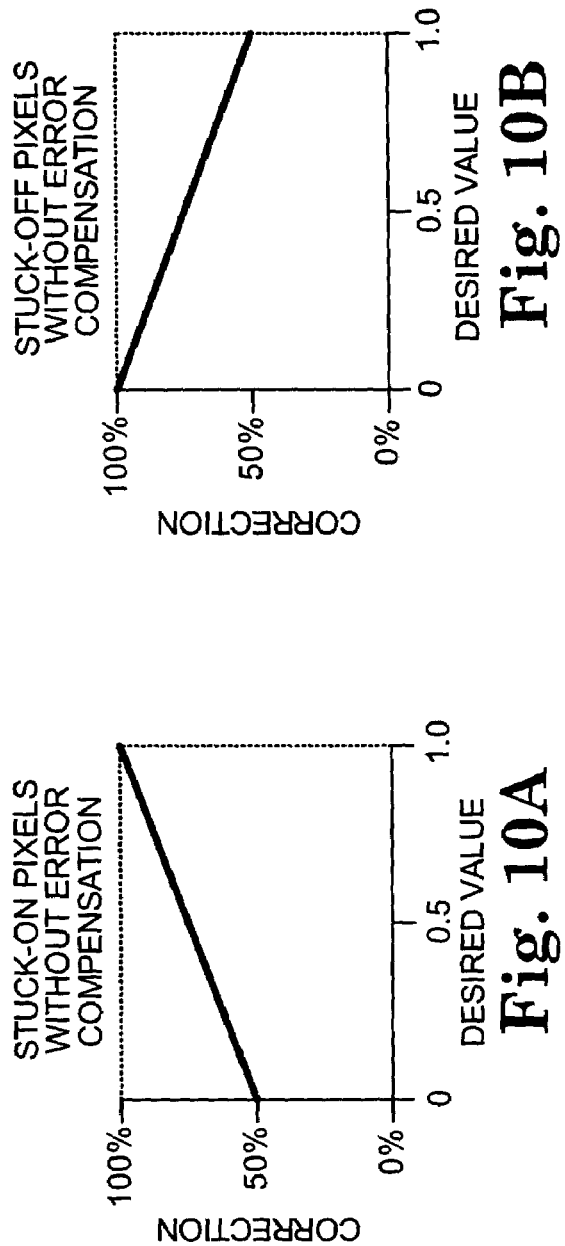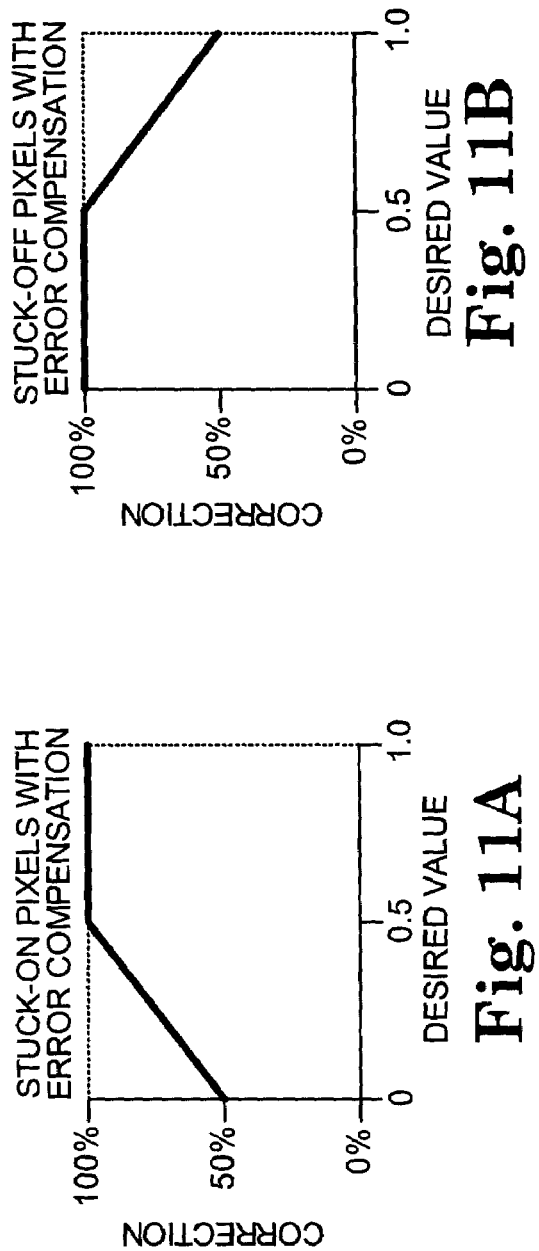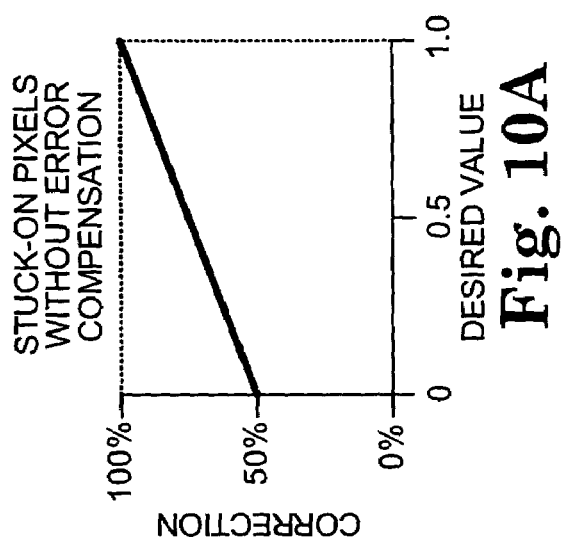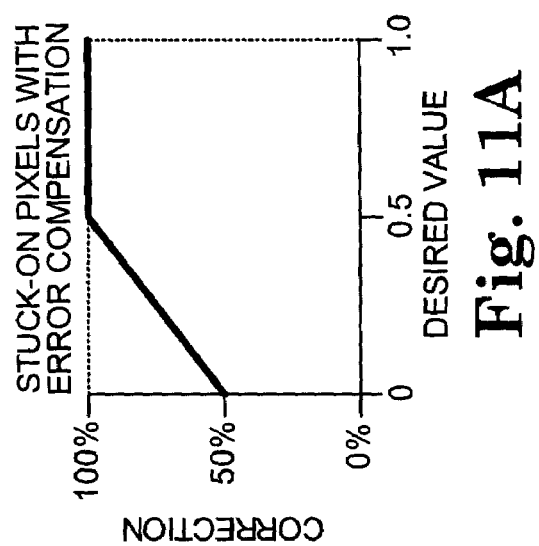

SYSTEM AND METHOD FOR CORRECTING DEFECTIVE PIXELS OF A DISPLAY DEVICE

CROSS-REFERENCE TO RELATED APPLICATIONS

This application is related to U.S. patent application Ser. No. 10/213,555, filed on Aug. 7, 2002, entitled IMAGE DISPLAY SYSTEM AND METHOD; U.S. patent application Ser. No. 10/242,195, filed on Sep. 11, 2002, entitled IMAGE DISPLAY SYSTEM AND METHOD; U.S. patent application Ser. No. 10/242,545, filed on Sep. 11, 2002, entitled IMAGE DISPLAY SYSTEM AND METHOD; U.S. patent application Ser. No. 10/631,681, filed Jul. 31, 2003, entitled GENERATING AND DISPLAYING SPATIALLY OFFSET SUB-FRAMES; U.S. patent application Ser. No. 10/632,042, filed Jul. 31, 2003, entitled GENERATING AND DISPLAYING SPATIALLY OFFSET SUB-FRAMES; U.S. patent application Ser. No. 10/672,845, filed Sep. 26, 2003, entitled GENERATING AND DISPLAYING SPATIALLY OFFSET SUB-FRAMES; U.S. patent application Ser. No. 10/672,544, filed Sep. 26, 2003, entitled GENERATING AND DISPLAYING SPATIALLY OFFSET SUB-FRAMES; U.S. patent application Ser. No. 10/697,605, filed Oct. 30, 2003, entitled GENERATING AND DISPLAYING SPATIALLY OFFSET SUB-FRAMES ON A DIAMOND GRID; U.S. patent application Ser. No. 10/696,888, filed Oct. 30, 2003, entitled GENERATING AND DISPLAYING SPATIALLY OFFSET SUB-FRAMES ON DIFFERENT TYPES OF GRIDS; U.S. patent application Ser. No. 10/697,830, filed Oct. 30, 2003, entitled IMAGE DISPLAY SYSTEM AND METHOD; U.S. patent application Ser. No. 10/750,591, filed Dec. 31, 2003, entitled DISPLAYING SPATIALLY OFFSET SUB-FRAMES WITH A DISPLAY DEVICE HAVING A SET OF DEFECTIVE DISPLAY PIXELS; U.S. patent application Ser. No. 10/768,621, filed Jan. 30, 2004, entitled GENERATING AND DISPLAYING SPATIALLY OFFSET SUB-FRAMES; U.S. patent application Ser. No. 10/768,215, filed Jan. 30, 2004, entitled DISPLAYING SUB-FRAMES AT SPATIALLY OFFSET POSITIONS ON A CIRCLE; U.S. patent application Ser. No. 10/821,135, filed Apr. 8, 2004, entitled GENERATING AND DISPLAYING SPATIALLY OFFSET SUB-FRAMES; U.S. patent application Ser. No. 10/821,130, filed Apr. 8, 2004, entitled GENERATING AND DISPLAYING SPATIALLY OFFSET SUB-FRAMES; U.S. patent application Ser. No. 10/820,952, filed Apr. 8, 2004, entitled GENERATING AND DISPLAYING SPATIALLY OFFSET SUB-FRAMES; U.S. patent application Ser. No. 10/864,125, filed Jun. 9, 2004, entitled GENERATING AND DISPLAYING SPATIALLY OFFSET SUB-FRAMES; U.S. patent application Ser. No. 10/868,719, filed Jun. 15, 2004, entitled GENERATING AND DISPLAYING SPATIALLY OFFSET SUB-FRAMES, and U.S. patent application Ser. No. 10/868,638, filed Jun. 15, 2004, entitled GENERATING AND DISPLAYING SPATIALLY OFFSET SUB-FRAMES. Each of the above U.S. patent applications is assigned to the assignee of the present invention, and is hereby incorporated by reference herein.

BACKGROUND

A conventional system or device for displaying an image, such as a display, projector, or other imaging system, produces a displayed image by addressing an array of individual picture elements or pixels arranged in a pattern, such as in horizontal rows and vertical columns, a diamond grid, or other pattern.

Unfortunately, if one or more of the pixels of the display device is defective, the displayed image will replicate the defect. For example, if a pixel of the display device exhibits only an "ON" position, the pixel may produce a solid white square in the displayed image. In addition, if a pixel of the display device exhibits only an "OFF" position, the pixel may produce a solid black square in the displayed image. Thus, the effect of the defective pixel or pixels of the display device may be readily visible in the displayed image.

SUMMARY

One form of the present invention provides a method of displaying an image with a display device having a plurality of defective pixels. The method comprises selecting an offset between a first sub-frame and a second sub-frame using information associated with the plurality of defective pixels, generating the first sub-frame and the second sub-frame using image data for the image, adjusting a first sub-frame pixel value in the first sub-frame associated with one of the plurality of defective pixels, and alternating between displaying the first sub-frame in a first position and displaying the second sub-frame in a second position, the second position displaced from the first position by an amount defined by the offset.

BRIEF DESCRIPTION OF THE DRAWINGS

FIGS. 2A-2C are schematic diagrams illustrating the display of two sub-frames according to one embodiment of the present invention.

FIGS. 3A-3E are schematic diagrams illustrating the display of four sub-frames according to one embodiment of the present invention.

FIGS. 5A-5C are schematic diagrams illustrating the display of two sub-frames by a display device with defective pixels according to one embodiment of the present invention.

FIGS. 6A-6C are schematic diagrams illustrating rankings of offsets for different types of aspect ratios according to one embodiment of the present invention.

FIG. 7 is a schematic diagram illustrating the generation of sub-frame pixel values for a display device with defective pixels according to one embodiment of the present invention.

FIGS. 10A-10B are graphical diagrams illustrating the amount of correction of defective pixels without error compensation according to one embodiment of the present invention.

FIGS. 11A-11B are graphical diagrams illustrating the amount of correction of defective pixels with error compensation according to one embodiment of the present invention.

DETAILED DESCRIPTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

I. Spatial and Temporal Shifting of Sub-Frames

Some display systems, such as some digital light projectors, may not have sufficient resolution to display some high resolution images. Such systems can be configured to give the appearance to the human eye of higher resolution images by displaying spatially and temporally shifted lower resolution images. The lower resolution images are referred to as sub-frames. A problem of sub-frame generation, which is addressed by embodiments of the present invention, is to determine appropriate values for the sub-frames so that the displayed sub-frames are close in appearance to how the high-resolution image from which the sub-frames were derived would appear if directly displayed.

One embodiment of a display system that provides the appearance of enhanced resolution through temporal and spatial shifting of sub-frames is described in the U.S. patent applications cited above, and is summarized below with reference to FIGS. 1-4E.

Figure 1:
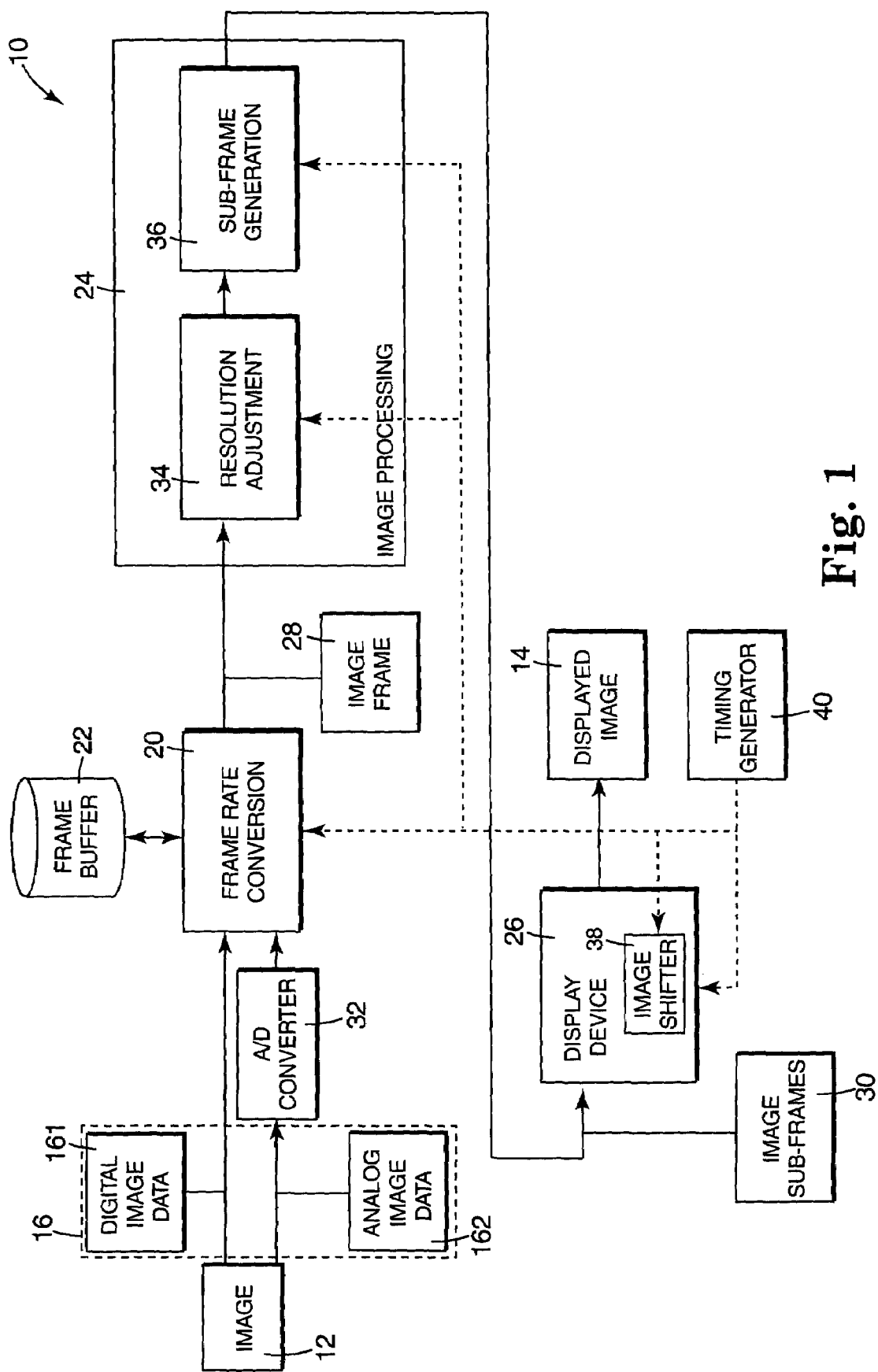
FIG. 1 is a block diagram illustrating an image display system according to one embodiment of the present invention.

FIG. 1 is a block diagram illustrating an image display system 10 according to one embodiment of the present invention. Image display system 10 facilitates processing of an image 12 to create a displayed image 14. Image 12 is defined to include any pictorial, graphical, and/or textural characters, symbols, illustrations, and/or other representation of information. Image 12 is represented, for example, by image data 16. Image data 16 includes individual picture elements or pixels of image 12. While one image is illustrated and described as being processed by image display system 10, it is understood that a plurality or series of images may be processed and displayed by image display system 10.

In one embodiment, image display system 10 includes a frame rate conversion unit 20 and an image frame buffer 22, an image processing unit 24, and a display device 26. As described below, frame rate conversion unit 20 and image frame buffer 22 receive and buffer image data 16 for image 12 to create an image frame 28 for image 12. Image processing unit 24 processes image frame 28 to define one or more image sub-frames 30 for image frame 28, and display device 26 temporally and spatially displays image sub-frames 30 to produce displayed image 14.

Image display system 10, including frame rate conversion unit 20 and/or image processing unit 24, includes hardware, software, firmware, or a combination of these. In one embodiment, one or more components of image display system 10, including frame rate conversion unit 20 and/or image processing unit 24, are included in a computer, computer server, or other microprocessor-based system capable of performing a sequence of logic operations. In addition, processing can be distributed throughout the system with individual portions being implemented in separate system components.

Image data 16 may include digital image data 161 or analog image data 162. To process analog image data 162, image display system 10 includes an analog-to-digital (A/D) converter 32. As such, A/D converter 32 converts analog image data 162 to digital form for subsequent processing. Thus, image display system 10 may receive and process digital image data 161 and/or analog image data 162 for image 12.

Frame rate conversion unit 20 receives image data 16 for image 12 and buffers or stores image data 16 in image frame buffer 22. More specifically, frame rate conversion unit 20 receives image data 16 representing individual lines or fields of image 12 and buffers image data 16 in image frame buffer 22 to create image frame 28 for image 12. Image frame buffer 22 buffers image data 16 by receiving and storing all of the image data for image frame 28, and frame rate conversion unit 20 creates image frame 28 by subsequently retrieving or extracting all of the image data for image frame 28 from image frame buffer 22. As such, image frame 28 is defined to include a plurality of individual lines or fields of image data 16 representing an entirety of image 12. Thus, image frame 28 includes a plurality of columns and a plurality of rows of individual pixels representing image 12.

Frame rate conversion unit 20 and image frame buffer 22 can receive and process image data 16 as progressive image data and/or interlaced image data. With progressive image data, frame rate conversion unit 20 and image frame buffer 22 receive and store sequential fields of image data 16 for image 12. Thus, frame rate conversion unit 20 creates image frame 28 by retrieving the sequential fields of image data 16 for image 12. With interlaced image data, frame rate conversion unit 20 and image frame buffer 22 receive and store odd fields and even fields of image data 16 for image 12. For example, all of the odd fields of image data 16 are received and stored and all of the even fields of image data 16 are received and stored. As such, frame rate conversion unit 20 de-interlaces image data 16 and creates image frame 28 by retrieving the odd and even fields of image data 16 for image 12.

Image frame buffer 22 includes memory for storing image data 16 for one or more image frames 28 of respective images 12. Thus, image frame buffer 22 constitutes a database of one or more image frames 28. Examples of image frame buffer 22 include non-volatile memory (e.g., a hard disk drive or other persistent storage device) and may include volatile memory (e.g., random access memory (RAM)).

By receiving image data 16 at frame rate conversion unit 20 and buffering image data 16 with image frame buffer 22, input timing of image data 16 can be decoupled from a timing requirement of display device 26. More specifically, since image data 16 for image frame 28 is received and stored by image frame buffer 22, image data 16 can be received as input at any rate. As such, the frame rate of image frame 28 can be converted to the timing requirement of display device 26. Thus, image data 16 for image frame 28 can be extracted from image frame buffer 22 at a frame rate of display device 26.

In one embodiment, image processing unit 24 includes a resolution adjustment unit 34 and a sub-frame generation unit 36. As described below, resolution adjustment unit 34 receives image data 16 for image frame 28 and adjusts a resolution of image data 16 for display on display device 26, and sub-frame generation unit 36 generates a plurality of image sub-frames 30 for image frame 28. More specifically, image processing unit 24 receives image data 16 for image frame 28 at an original resolution and processes image data 16 to increase, decrease, and/or leave unaltered the resolution of image data 16. Accordingly, with image processing unit 24, image display system 10 can receive and display image data 16 of varying resolutions.

Sub-frame generation unit 36 receives and processes image data 16 for image frame 28 to define a plurality of image sub-frames 30 for image frame 28. If resolution adjustment unit 34 has adjusted the resolution of image data 16, sub-frame generation unit 36 receives image data 16 at the adjusted resolution. The adjusted resolution of image data 16 may be increased, decreased, or the same as the original resolution of image data 16 for image frame 28. Sub-frame generation unit 36 generates image sub-frames 30 with a resolution which matches the resolution of display device 26. Image sub-frames 30 are each of an area equal to image frame 28. Sub-frames 30 each include a plurality of columns and a plurality of rows of individual pixels representing a subset of image data 16 of image 12, and have a resolution that matches the resolution of display device 26.

Each image sub-frame 30 includes a matrix or array of pixels for image frame 28. Image sub-frames 30 are spatially offset from each other such that each image sub-frame 30 includes different pixels and/or portions of pixels. As such, image sub-frames 30 are offset from each other by a vertical distance and/or a horizontal distance, as described below.

Display device 26 receives image sub-frames 30 from image processing unit 24 and sequentially displays image sub-frames 30 to create displayed image 14. More specifically, as image sub-frames 30 are spatially offset from each other, display device 26 displays image sub-frames 30 in different positions according to the spatial offset of image sub-frames 30, as described below. As such, display device 26 alternates between displaying image sub-frames 30 for image frame 28 to create displayed image 14. Accordingly, display device 26 displays an entire sub-frame 30 for image frame 28 at one time.

In one embodiment, display device 26 performs one cycle of displaying image sub-frames 30 for each image frame 28. Display device 26 displays image sub-frames 30 so as to be spatially and temporally offset from each other. In one embodiment, display device 26 optically steers image sub-frames 30 to create displayed image 14. As such, individual pixels of display device 26 are addressed to multiple locations.

In one embodiment, display device 26 includes an image shifter 38. Image shifter 38 spatially alters or offsets the position of image sub-frames 30 as displayed by display device 26. More specifically, image shifter 38 varies the position of display of image sub-frames 30, as described below, to produce displayed image 14.

In one embodiment, display device 26 includes a light modulator for modulation of incident light. The light modulator includes, for example, a plurality of micro-mirror devices arranged to form an array of micro-mirror devices. As such, each micro-mirror device constitutes one cell or pixel of display device 26. Display device 26 may form part of a display, projector, or other imaging system.

In one embodiment, image display system 10 includes a timing generator 40. Timing generator 40 communicates, for example, with frame rate conversion unit 20, image processing unit 24, including resolution adjustment unit 34 and sub-frame generation unit 36, and display device 26, including image shifter 38. As such, timing generator 40 synchronizes buffering and conversion of image data 16 to create image frame 28, processing of image frame 28 to adjust the resolution of image data 16 and generate image sub-frames 30, and positioning and displaying of image sub-frames 30 to produce displayed image 14. Accordingly, timing generator 40 controls timing of image display system 10 such that entire sub-frames of image 12 are temporally and spatially displayed by display device 26 as displayed image 14.

In one embodiment, as illustrated in FIGS. 2A and 2B, image processing unit 24 defines two image sub-frames 30 for image frame 28. More specifically, image processing unit 24 defines a first sub-frame 301 and a second sub-frame 302 for image frame 28. As such, first sub-frame 301 and second sub-frame 302 each include a plurality of columns and a plurality of rows of individual pixels 18 of image data 16. Thus, first sub-frame 301 and second sub-frame 302 each constitute an image data array or pixel matrix of a subset of image data 16.

In one embodiment, as illustrated in FIG. 2B, second sub-frame 302 is offset from first sub-frame 301 by a vertical distance 50 and a horizontal distance 52. As such, second sub-frame 302 is spatially offset from first sub-frame 301 by a predetermined distance. In one illustrative embodiment, vertical distance 50 and horizontal distance 52 are each approximately one-half of one pixel.

As illustrated in FIG. 2C, display device 26 alternates between displaying first sub-frame 301 in a first position and displaying second sub-frame 302 in a second position spatially offset from the first position. More specifically, display device 26 shifts display of second sub-frame 302 relative to display of first sub-frame 301 by vertical distance 50 and horizontal distance 52. As such, pixels of first sub-frame 301 overlap pixels of second sub-frame 302. In one embodiment, display device 26 performs one cycle of displaying first sub-frame 301 in the first position and displaying second sub-frame 302 in the second position for image frame 28. Thus, second sub-frame 302 is spatially and temporally displayed relative to first sub-frame 301. The display of two temporally and spatially shifted sub-frames in this manner is referred to herein as two-position processing.

In another embodiment, as illustrated in FIGS. 3A-3D, image processing unit 24 defines four image sub-frames 30 for image frame 28. More specifically, image processing unit 24 defines a first sub-frame 301, a second sub-frame 302, a third sub-frame 303, and a fourth sub-frame 304 for image frame 28. As such, first sub-frame 301, second sub-frame 302, third sub-frame 303, and fourth sub-frame 304 each include a plurality of columns and a plurality of rows of individual pixels 18 of image data 16.

In one embodiment, as illustrated in FIGS. 3B-3D, second sub-frame 302 is offset from first sub-frame 301 by a vertical distance 50 and a horizontal distance 52, third sub-frame 303 is offset from first sub-frame 301 by a horizontal distance 54, and fourth sub-frame 304 is offset from first sub-frame 301 by a vertical distance 56. As such, second sub-frame 302, third sub-frame 303, and fourth sub-frame 304 are each spatially offset from each other and spatially offset from first sub-frame 301 by a predetermined distance. In one illustrative embodiment, vertical distance 50, horizontal distance 52, horizontal distance 54, and vertical distance 56 are each approximately one-half of one pixel.

As illustrated schematically in FIG. 3E, display device 26 alternates between displaying first sub-frame 301 in a first position $P_1$, displaying second sub-frame 302 in a second position $P_2$ spatially offset from the first position, displaying third sub-frame 303 in a third position $P_3$ spatially offset from the first position, and displaying fourth sub-frame 304 in a fourth position $P_4$ spatially offset from the first position. More specifically, display device 26 shifts display of second sub-frame 302, third sub-frame 303, and fourth sub-frame 304 relative to first sub-frame 301 by the respective predetermined distance. As such, pixels of first sub-frame 301, second sub-frame 302, third sub-frame 303, and fourth sub-frame 304 overlap each other.

In one embodiment, display device 26 performs one cycle of displaying first sub-frame 301 in the first position, displaying second sub-frame 302 in the second position, displaying third sub-frame 303 in the third position, and displaying fourth sub-frame 304 in the fourth position for image frame 28. Thus, second sub-frame 302, third sub-frame 303, and fourth sub-frame 304 are spatially and temporally displayed relative to each other and relative to first sub-frame 301. The display of four temporally and spatially shifted sub-frames in this manner is referred to herein as four-position processing.

Figure 4E:
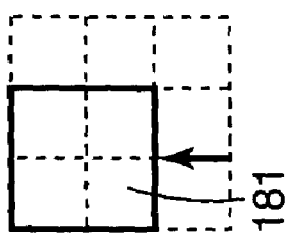
FIGS. 4A-4E are schematic diagrams illustrating the display of a pixel with an image display system according to one embodiment of the present invention.
Figure 4D:
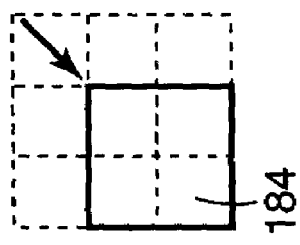
Figure 4C:
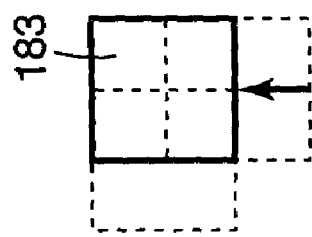
Figure 4B:
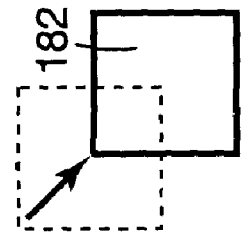
Figure 4A:
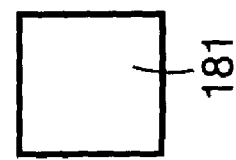

FIGS. 4A-4E illustrate one embodiment of completing one cycle of displaying a pixel 181 from first sub-frame 301 in the first position, displaying a pixel 182 from second sub-frame 302 in the second position, displaying a pixel 183 from third sub-frame 303 in the third position, and displaying a pixel 184 from fourth sub-frame 304 in the fourth position. More specifically, FIG. 4A illustrates display of pixel 181 from first sub-frame 301 in the first position, FIG. 4B illustrates display of pixel 182 from second sub-frame 302 in the second position (with the first position being illustrated by dashed lines), FIG. 4C illustrates display of pixel 183 from third sub-frame 303 in the third position (with the first position and the second position being illustrated by dashed lines), FIG. 4D illustrates display of pixel 184 from fourth sub-frame 304 in the fourth position (with the first position, the second position, and the third position being illustrated by dashed lines), and FIG. 4E illustrates display of pixel 181 from first sub-frame 301 in the first position (with the second position, the third position, and the fourth position being illustrated by dashed lines).

Sub-frame generation unit 36 (FIG. 1) generates sub-frames 30 based on image data in image frame 28. It will be understood by a person of ordinary skill in the art that functions performed by sub-frame generation unit 36 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

In one form of the invention, sub-frames 30 have a lower resolution than image frame 28. Thus, sub-frames 30 are also referred to herein as low resolution images 30, and image frame 28 is also referred to herein as a high resolution image 28. It will be understood by persons of ordinary skill in the art that the terms low resolution and high resolution are used herein in a comparative fashion, and are not limited to any particular minimum or maximum number of pixels. Sub-frame generation unit 36 is configured to use any suitable algorithm to generate pixel values for sub-frames 30.

II. Error Compensation for Defective Pixels

In one embodiment, display device 26 comprises a plurality of display pixels arranged in a plurality of rows and a plurality of columns to form a pixel array. Each display pixel modulates light to display image sub-frames 30 for image frame 28 and reproduce displayed image 14. One or more of the display pixels of display device 26 may be defective. A defective pixel is defined as an aberrant or inoperative display pixel of display device 26 such as a display pixel that operates only in an "ON", i.e., stuck-on, or an "OFF", i.e., stuck-off, position, a display pixel that produces significantly more or less than an intended amount of intensity, and/or a display pixel that operates inconsistently, intermittently, or randomly.

To compensate for defective pixels in display device 26, image processing unit 24 selects an offset for displaying sub-frames 30 as described below with reference to FIGS. 5A-5C and 6A-6C and adjusts sub-frame pixel values associated with defective pixels and edge pixels as described below with reference to FIG. 7.

FIGS. 5A-5C are schematic diagrams illustrating one embodiment of the display of two sub-frames 30A and 30B by display device 26. Display pixels of display device 26 are identified by row (A-F) and column (1-8) positions. The positions of row G and column 9 represent the portion of sub-frame 30B that is outside of the pixel array of display device 26 and is not displayed. In the example shown in FIGS. 5A-5C, display device 26 comprises five defective pixels as indicated by the fully darkened and fully illuminated pixel positions in FIGS. 5A and 5B.

FIGS. 5A and 5B illustrate the separate display of sub-frames 30A and 30B, respectively. Sub-frames 30A and 30B are shown being displayed with a one pixel horizontal offset and a one pixel vertical offset in FIGS. 5A and 5B as indicated by the dotted lines in FIGS. 5A and 5B. During the display of sub-frame 30A or sub-frame 30B, the defective pixels appear fully darkened or fully illuminated. In displaying sub-frame 30A, three stuck-off defective pixels appear in positions C3, D4, and E4 and two stuck-on defective pixels appear in positions B5 and D7. In displaying sub-frame 30B, three stuck-off defective pixels appear in positions D4, E5, and F5 and two stuck-on defective pixels appear in positions C6 and E8. The pixel positions in row G and column 9 are shown as blank to indicate that they are outside of the pixel array of display device 26.

FIG. 5C illustrates the combined display of sub-frames 30A and 30B, i.e., displayed image 14, where display device 26 alternately displays sub-frames 30A and 30B. In displayed image 14, the effect of the defective pixels is moderated for some positions by alternating the display of sub-frames 30A and 30B. More particularly, the display pixel values in positions C3, E4, E5, F5, B5, C6, D7, and E8 represent the combined sub-frame pixel values from sub-frames 30A and 30B. As shown in FIGS. 5A and 5B, each of these display pixel positions is either fully darkened or fully illuminated by one of sub-frames 30A or 30B. The other sub-frame 30A or 30B, however, causes the correct display pixel value to be displayed in each of these display pixel positions. As a result, the display pixel values displayed by these positions are less illuminated if the display positions are associated with the stuck-off display pixels (i.e., positions C3, E4, E5, and F5) or more illuminated if the display positions associated with the stuck-on display pixels (i.e., positions B5, C6, D7, and E8).

The effect of defective pixels is not moderated for the display pixel in position D4, however, as indicated by the fully darkened display pixel in FIG. 5C. The display pixel value of position D4 represents the combined sub-frame pixel values from sub-frames 30A and 30B. As seen in FIG. 5A, the position D4 in sub-frame 30A is a stuck-off defective pixel. The position D4 in sub-frame 30B is also a stuck-off defective pixel. Accordingly, both sub-frames 30A and 30B cause the display pixel at position D4 to be fully darkened and the effect of the defective pixels is not moderated.

Display pixels whose values represent contributions from two or more defective pixels-whether the pixels are all stuck-on, all stuck-off, or a combination of stuck-off and stuck-on-are referred to as stuck-on-stuck pixels. With two position processing, stuck-on-stuck pixels may result in fully darkened, fully illuminated, or 50% gray display pixels depending on the types of stuck-on-stuck pixels. Stuck-on-stuck pixels may not be corrected with two position processing.

As shown in FIG. 5C, the edge pixels of displayed image 14, i.e., the pixels in row A and the pixels in column 1, are fully darkened during the display of sub-frame 30B. As a result, the display pixel values displayed by these positions are illuminated less than their desired values. The number and location of edge pixels results from the offset of sub-frames 30A and 30B.

The offset of sub-frames 30A and 30B may be selected to minimize the number of stuck-on-stuck pixels such as the pixel in position D4 in FIG. 5C and the number of edge pixels such as the pixels in column 1 and row A in FIG. 5C. In one embodiment, image processing unit 24 receives or accesses defective pixel information that indicates which pixels in the pixel array of display device 26 are defective. Image processing unit 24 determines the number of stuck-on-stuck pixels for a plurality of possible offsets for sub-frames 30A and 30B. Image processing unit 24 selects the offset with the fewest stuck-on-stuck pixels. If two or more offsets have the same number of stuck-on-stuck pixels, image processing unit 24 selects the offset with the fewest edge pixels. If two or more offsets have the same number of stuck-on-stuck pixels and the same number of edge pixels, image processing unit 24 may selects any one of these two or more offsets using any suitable criteria. Because the defective pixel information may be considered unchanging, image processing unit 24 may need to perform the process of selecting an offset only once.

In one embodiment, image processing unit 24 determines the number of stuck-on-stuck pixels for integer combinations of horizontal and vertical offsets of up to three pixels in each direction. Because the sub-frames 30A and 30B may be offset from one another in two horizontal and two vertical directions (e.g., left and right and up and down, respectively), image processing unit 24 determines the number of stuck-on-stuck pixels for up to 48 different integer combinations of horizontal and vertical offsets in this embodiment. In other embodiments, image processing unit 24 determines the number of stuck-on-stuck pixels for integer combinations of horizontal and vertical offsets of other numbers of pixels in each direction.

As noted above, image processing unit 24 selects the offset with the fewest edge pixels if two or more offsets have the same number of stuck-on-stuck pixels. The number of edge pixels for each offset differs according to the aspect ratio of display device 26. FIGS. 6A-6C are schematic diagrams 402, 404, and 406, respectively, illustrating one embodiment of ranking of offsets according to the fewest edge pixels for a 4:3 aspect ratio, a 16:9 aspect ratio, and a 3:2 aspect ratio, respectively. The rankings are determined by the number of edge pixels that result from each offset for each aspect ratio. For example, in FIG. 6A, an offset of one horizontal pixel (i.e., no vertical offset) results in the fewest number of edge pixels for the 4:3 aspect ratio as indicated by the number 1 to the right and to the left of the darkened, zero offset position. Similarly, an offset of three vertical pixels and three horizontal pixels (FIG. 6C) results in the highest number of edge pixels for a 3:2 aspect ratio as indicated by the number 13 in the four possible positions that are three horizontal and three vertical pixels away from the darkened position. Accordingly, image processing unit 24 selects the offset with the fewest edge pixels according to the aspect ratio of display device 26 if two or more offsets have the same number of stuck-on-stuck pixels.

Using the selected offset, image processing unit 24 generates sub-frame pixel values for sub-frames 30A and 30B by correcting defective and edge pixels. FIG. 7 is a schematic diagram illustrating one embodiment of the generation of sub-frame pixel values for two position processing where display device 26 includes defective pixels. In the example of FIG. 7, image frame 28 includes the desired pixel values A through L. Display device 26, however, includes a stuck-off pixel 452 and a stuck-on pixel 454 as shown in sub-frames 30A and 30B. Based on the number of stuck-on-stuck pixels, image processing unit 24 has selected an offset of one horizontal pixel and one vertical pixel as indicated by an arrow 456 for this example using the process described above.

In the example shown in FIG. 7, image processing unit 24 corrects sub-frame pixels in sub-frames 30A and 30B for defective and edge pixels by adjusting the sub-frame pixel values associated with the defective and edge pixels. By doing so, the desired pixel values in image frame 28 may be reproduced by displayed image 14 as closely as possible.

For two position processing, each displayed pixel value in displayed image 14 is the sum of one-half of a sub-frame pixel value in sub-frame 30A and one-half of a sub-frame pixel value in sub-frame 30B as indicated in FIG. 7. For example, the displayed pixel value F in displayed image 14 is the sum of one-half of the sub-frame pixel value F in sub-frame 30A and one-half of a sub-frame pixel value F in sub-frame 30B, i.e., ½(F)+½(F)=F. For displayed pixel values that are not associated with a defective or an edge pixel, image processing unit 24 generates sub-frame pixels values that correspond to the displayed pixel values by setting them to be equal to the displayed pixel value. Examples of such displayed pixel values in FIG. 7 include displayed pixel values F, H, and K where the corresponding sub-frame pixel values in sub-frames 30A and 30B are each F, H, and K, respectively.

For displayed pixel values that are associated with a defective or an edge pixel, image processing unit 24 generates sub-frame pixels values that correspond to the displayed pixel values by adjusting the sub-frame pixel values to approximate the desired pixel values in image frame 28.

For stuck-off pixels, such as stuck-off pixel 452, displayed pixels in displayed image 14 associated with stuck-off pixels are fully darkened during the display of either sub-frame 30A or sub-frame 30B. Accordingly, image processing unit 24 increases a sub-frame pixel value in either sub-frame 30A or sub-frame 30B to compensate for the fully darkened pixels. For example, image processing unit 24 increases sub-frame pixel value $G_2$ in sub-frame 30B to compensate for the stuck-off pixel 452 in sub-frame 30A. Similarly, image processing unit 24 increases sub-frame pixel value $L_1$ in sub-frame 30A to compensate for the stuck-off pixel 452 in sub-frame 30B. As a result, displayed image 14 includes displayed pixel values $G_S$ and $L_S$ that are associated with the stuck-off pixel 452. Because the displayed value of a stuck-off pixel may be represented as "0", the displayed pixel values of $G_S$ and $L_S$ may be represented as shown in Equations I and II, respectively.

$$G_S = \tfrac{1}{2}(0) + \tfrac{1}{2}(G_2) = \tfrac{1}{2}(G_2) \qquad \text{Equation I}$$

$$L_S = \tfrac{1}{2}(L_1) + \tfrac{1}{2}(0) = \tfrac{1}{2}(L_1) \qquad \text{Equation II}$$

For stuck-on pixels, such as stuck-on pixel 454, displayed pixels in displayed image 14 associated with stuck-on pixels are fully illuminated during the display of either sub-frame 30A or sub-frame 30B. Accordingly, image processing unit 24 decreases a sub-frame pixel value in either sub-frame 30A or sub-frame 30B to compensate for the fully illuminated pixels. For example, image processing unit 24 decreases sub-frame pixel value $J_2$ in sub-frame 30B to compensate for the stuck-on pixel 454 in sub-frame 30A. As a result, displayed image 14 includes displayed pixel value $J_S$ that is associated with the stuck-on pixel 454. Because the displayed value of a stuck-on pixel may be represented as "1", the displayed pixel value of $J_S$ may be represented as shown in Equation III.

$$J_S = \tfrac{1}{2}(1) + \tfrac{1}{2}(J_2) = \tfrac{1}{2} + \tfrac{1}{2}(G_2) \qquad \text{Equation III}$$

For edge pixels, displayed pixels in displayed image 14 associated with edge pixels are fully darkened during the display of sub-frame 30B. Accordingly, image processing unit 24 increases sub-frame pixel values in sub-frame 30A to compensate for the fully darkened pixels. For example, image processing unit 24 increases sub-frame pixel values $A_1$, $B_1$, $C_1$, $D_1$, $E_1$, and $I_1$ in sub-frame 30A to compensate for the edge pixels that are not illuminated during the display of sub-frame 30B. As a result, displayed image 14 includes displayed pixel values $A_S$, $B_S$, $C_S$, $D_S$, $E_S$, and $I_S$ that are associated with the edge pixels. Because the displayed value of an edge pixel may be represented as "0", the displayed pixel value of As may be represented as shown in Equation IV.

$$A_S = \tfrac{1}{2}(A_1) + \tfrac{1}{2}(0) = \tfrac{1}{2}(A_1) \qquad \text{Equation IV}$$

The displayed pixel value of $B_S$, $C_S$, $D_S$, $E_S$, and $I_S$ may be represented using similar equations.

Figure 8:
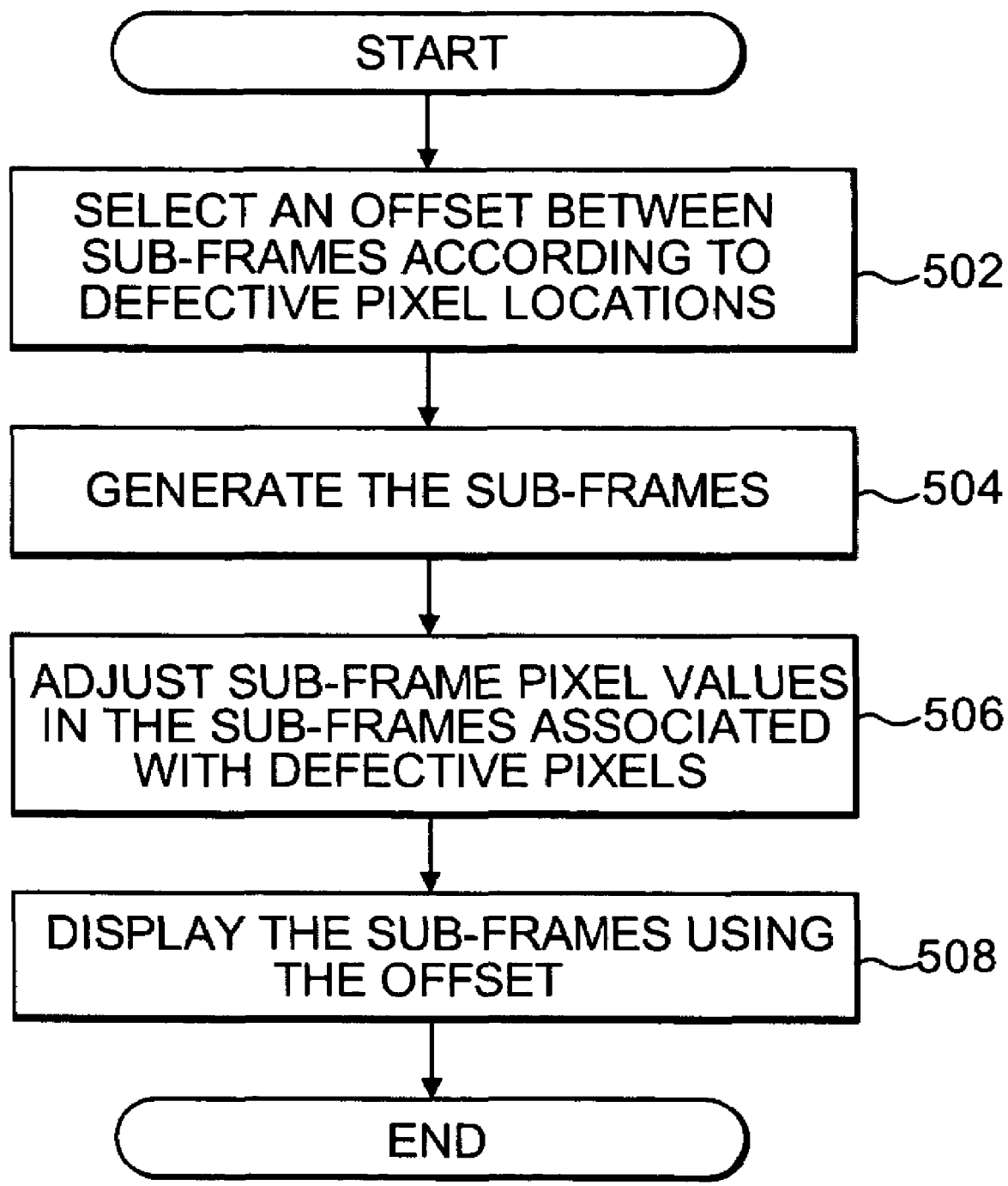
FIG. 8 is a flow chart illustrating a method for generating sub-frame pixel values for a display device with defective pixels according to one embodiment of the present invention.

FIG. 8 is a flow chart illustrating a method for generating sub-frame pixel values for a display device with defective pixels. The method may be performed by image processing unit 24. In FIG. 8, an offset between two or more sub-frames 30 is selected according to defective pixel locations as indicated in a block 502. In one embodiment, image processing unit 24 selects the offset with the fewest number of stuck-on-stuck pixels, or the offset with the fewest number of edge pixels if two or more offsets have the same number of stuck-on-stuck pixels. Sub-frames 30 are generated as indicated in a block 504. Sub-frame pixel values in sub-frames 30 that are associated with the defective pixels are adjusted as indicated in a block 506. Sub-frames 30 are displayed by display device 26 using the offset as indicated in a block 508.

FIGS. 9A-9D illustrate the display of two sub-frames with an offset of one horizontal pixel and one vertical pixel as displayed images 14A-14D, respectively.

Figure 9B:
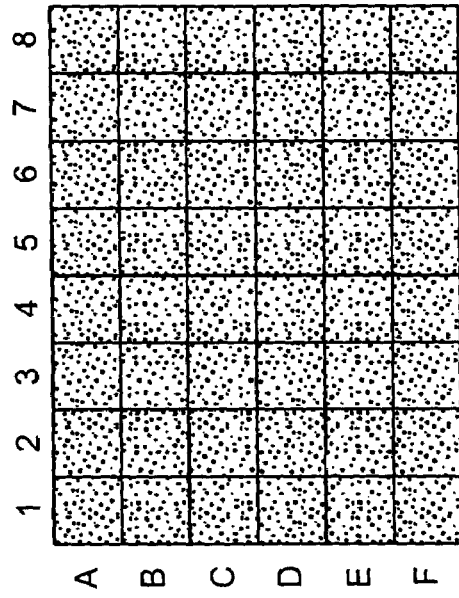
FIGS. 9A-9D are schematic diagrams illustrating the display of two sub-frames that include pixel correction according to one embodiment of the present invention.
Figure 9D:
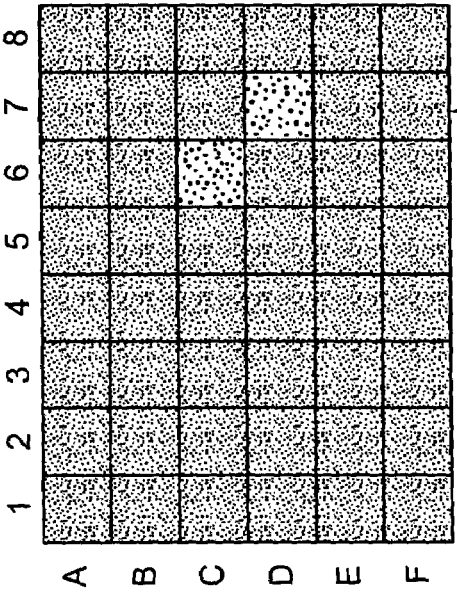
Figure 9A:
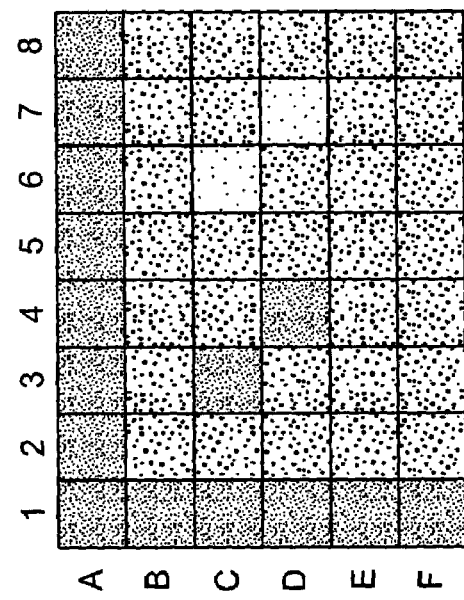

FIG. 9A is a schematic diagram illustrating one embodiment of the display of two sub-frames as a 50% gray displayed image 14A without pixel correction. As shown in FIG. 9A, a stuck-off pixel causes pixel positions C3 and D4 to be displayed darker than the desired value of 50% gray. Similarly, a stuck-on pixel causes pixel positions C6 and D7 to be displayed lighter than the desired value of 50% gray. Edge pixels cause the pixel positions in row A and column 1 to be displayed darker than the desired value of 50% gray. Because displayed image 14A does not include pixel correction, defective and edge pixels result in either display pixel values that are darker or lighter than the desired values.

FIG. 9B is a schematic diagram illustrating one embodiment of the display of two sub-frames as a 50% gray displayed image 14B with pixel correction performed by image processing unit 24 as described above. With pixel correction, defective and edge pixels may be fully corrected for 50% gray values. Accordingly, the pixel positions in row A and column 1 and the pixel positions C3, C6, D4, and D7 appear fully corrected in 50% gray displayed image 14B.

Figure 9C:
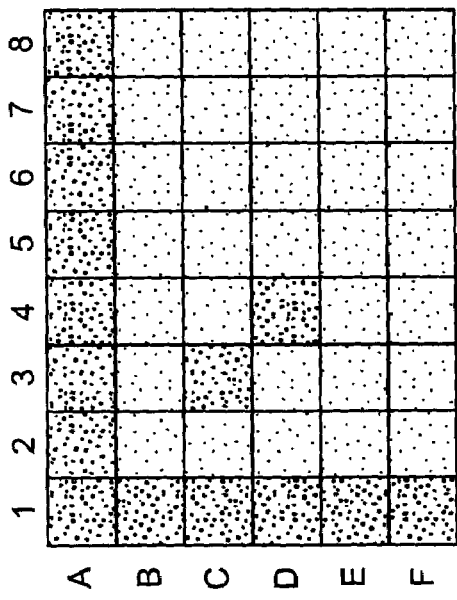

FIG. 9C is a schematic diagram illustrating one embodiment of the display of two sub-frames as a 25% gray displayed image 14C with pixel correction performed by image processing unit 24 as described above. With pixel correction, stuck-on pixels may be fully corrected for 25% gray values. Accordingly, pixel positions C6 and D7 appear fully corrected in 25% gray displayed image 14C. A stuck-off pixel, however, causes pixel positions C3 and D4 to be only partially corrected and displayed darker than the desired value of 25% gray. Similarly, edge pixels cause the pixel positions in row A and column 1 to be only partially corrected and displayed darker than the desired value of 25% gray. As a result, pixel positions C6 and D7 appear fully corrected in 25% gray displayed image 14C, but the pixel positions in row A and column 1 and the pixel positions C3 and D4 appear only partially corrected in 25% gray displayed image 14C.

FIG. 9D is a schematic diagram illustrating one embodiment of the display of two sub-frames as a 75% gray displayed image 14D with pixel correction performed by image processing unit 24 as described above. With pixel correction, stuck-off and edge pixels may be fully corrected for 75% gray values. Accordingly, pixel positions C3 and D4 and the pixel positions in row A and column 1 appear fully corrected in 75% gray displayed image 14D. A stuck-on pixel, however, causes pixel positions C6 and D7 to be only partially corrected and displayed lighter than the desired value of 75% gray. As a result, pixel positions C3 and D4 and the pixel positions in row A and column 1 appear fully corrected in 75% gray displayed image 14D, but the pixel positions C6 and D7 appear only partially corrected in 75% gray displayed image 14D.

FIGS. 10A-10B are graphical diagrams illustrating one embodiment of the percent correction of stuck-on pixels and stuck-off pixels, respectively, without error compensation in two position processing. The percent correction is the calculated as 1—(Delta/Range) where Delta is the difference between the displayed value and the desired value and Range is the range of output values, e.g., 0 to 1.

As shown in FIG. 10A, a displayed value is 100% correct for a stuck-on pixel only when the desired value is 1, i.e., fully illuminated, without error compensation. Other displayed values are less than 100% correct to a limit of 50% correct for a desired value of 0, i.e., fully darkened, without error compensation.

As shown in FIG. 10B, a displayed value is 100% correct for a stuck-off pixel only when the desired value is 0, i.e., fully darkened, without error compensation. Other displayed values are less than 100% correct to a limit of 50% correct for a desired value of 1, i.e., fully illuminated, without error compensation.

FIGS. 11A-11B are graphical diagrams illustrating one embodiment of the percent correction of stuck-on pixels and stuck-off pixels, respectively, with error compensation in two position processing.

As shown in FIG. 11A, a displayed value is 100% correct for a stuck-on pixel over the range 0.5, i.e., 50% illuminated, to 1, i.e., fully illuminated, with error compensation. Although other displayed values are less than 100% correct to a limit of 50% correct for a desired value of 0, i.e., fully darkened, with error compensation, the percent correction over the range of desired values may be seen as better overall when compared with no error compensation as shown in FIG. 10A.

As shown in FIG. 11B, a displayed value is 100% correct for a stuck-off pixel over the range 0.5, i.e., 50% darkened, to 0, i.e., fully darkened, with error compensation. Although other displayed values are less than 100% correct to a limit of 50% correct for a desired value of 1, i.e., fully illuminated, with error compensation, the percent correction over the range of desired values may be seen as better overall when compared with no error compensation as shown in FIG. 10B.

Although the above examples illustrate adjusting sub-frame pixel values for various percentages of gray field, image processing unit 24 may adjust sub-frame pixel values over a full gamut of colors to compensate for defective and/or edge pixels. For example, where displayed pixels in a displayed image 14 each comprise red, green, and blue components, image processing unit 24 may separately adjust the red, green, and blue components of sub-frame pixel values to compensate for defective and/or edge pixels.

In addition, image processing unit 24 may select an offset and compensate for defective and/or edge pixels in generating sub-frames for n position processing where n is an integer greater than 2, e.g., three or four position processing. With n position processing, full correction for either stuck-on or stuck off pixels may be achieve for (1-1/n) of the range of desired pixel values.

One of more of the above embodiments may advantageously provide enhanced defect correction for natural images. Because natural images generally include many desired values near the center of any color gamut, full correction may be possible for significant percentages of natural images.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of displaying an image with a display device having a plurality of defective pixels, the method comprising:
   identifying first and second numbers of stuck-on-stuck pixels caused by the plurality of defective pixels for first and second offsets, respectively, between a first sub-frame and a second sub-frame;
   selecting the first offset as a selected offset in response to the first number being less than the second number and the second offset as the selected offset in response to the second number being less than the first number;
   generating the first sub-frame and the second sub-frame using image data for the image;
   adjusting a first sub-frame pixel value in the first sub-frame associated with one of the plurality of defective pixels; and
   alternating between displaying the first sub-frame in a first position and displaying the second sub-frame in a second position, the second position displaced from the first position by an amount defined by the selected offset.

2. The method of claim 1 further comprising:
   selecting the first offset as the selected offset in response to the first number being equal to the second number and the first offset being associated with a lower number of edge pixels than the second offset.

3. The method of claim 1 further comprising:
   adjusting the first sub-frame pixel value in the first sub-frame by increasing the first sub-frame pixel value in response to the one of the plurality of defective pixels comprising a stuck-off pixel.

4. The method of claim 1 further comprising:
   adjusting the first sub-frame pixel value in the first sub-frame by decreasing the first sub-frame pixel value in response to the one of the plurality of defective pixels comprising a stuck-on pixel.

5. The method of claim 1 further comprising:
   adjusting a second sub-frame pixel value in the second sub-frame associated with the one of the plurality of defective pixels.

6. The method of claim 5 further comprising:
   adjusting the second sub-frame pixel value in the second sub-frame by increasing the second sub-frame pixel value in response to the one of the plurality of defective pixels comprising a stuck-off pixel.

7. The method of claim 5 further comprising:
   adjusting the second sub-frame pixel value in the second sub-frame by decreasing the second sub-frame pixel value in response to the one of the plurality of defective pixels comprising a stuck-on pixel.

8. The method of claim 1 further comprising:
   adjusting a second sub-frame pixel value in the first sub-frame associated with an edge pixel.

9. The method of claim 8 further comprising:
   adjusting the second sub-frame pixel value in the first sub-frame by increasing the second sub-frame pixel value.

10. The method of claim 1 wherein the selected offset comprises a horizontal offset and a vertical offset.

11. The method of claim 10 wherein the horizontal offset is equal to n pixels where n is an integer, and wherein the vertical offset is equal to m pixels where m is an integer.

12. A system for displaying an image, the system comprising:
    an image processing unit; and
    a display device having a plurality of defective pixels;
    wherein the image processing unit is configured to determine a selected offset from one of a plurality of possible offsets between a first sub-frame and a second sub-frame with a lowest number of stuck-on-stuck pixels caused by the plurality of defective pixels, wherein the image processing unit is configured to generate a first sub-frame and a second sub-frame using image data for the image, information associated with the plurality of defective pixels, and the selected offset, wherein the display device is configured to alternately display the first sub-frame in a first position and display the second sub-frame in a second position, and wherein the second position is displaced from the first position according to the selected offset.

13. The system of claim 12 wherein the image processing unit is configured to generate a third sub-frame and a fourth sub-frame using the image data, information associated with the plurality of defective pixels, and the selected offset, wherein the display device is configured to alternately display the third sub-frame in a third position and display the fourth sub-frame in a fourth position, and wherein the third position and the fourth position are displaced from the first position according to the selected offset.

14. The system of claim 12 wherein the image processing unit is configured to select the selected offset by determining a number of stuck-on-stuck pixels for each of the plurality of possible offsets.

15. The system of claim 14 wherein the selected offset as the one of the plurality of possible offsets with a lowest number of edge pixels in response to at least two of the plurality of possible offsets being associated with the lowest number of stuck-on-stuck pixels.

16. The system of claim 12 wherein the image processing unit is configured to adjust a first sub-frame pixel value in the first sub-frame by increasing the first sub-frame pixel value in response to one of the plurality of defective pixels associated with the first sub-frame pixel value comprising a stuck-off pixel.

17. The system of claim 16 wherein the image processing unit is configured to adjust a second sub-frame pixel value in the second sub-frame by increasing the second sub-frame pixel value in response to one of the plurality of defective pixels associated with the second sub-frame pixel value comprising a stuck-off pixel.

18. The system of claim 12 wherein the image processing unit is configured to adjust a first sub-frame pixel value in the first sub-frame by decreasing the first sub-frame pixel value in response to one of the plurality of defective pixels associated with the first sub-frame pixel value comprising a stuck-on pixel.

19. The system of claim 18 wherein the image processing unit is configured to adjust a second sub-frame pixel value in the second sub-frame by decreasing the second sub-frame pixel value in response to one of the plurality of defective pixels associated with the second sub-frame pixel value comprising a stuck-on pixel.

20. The system of claim 12 wherein the image processing unit is configured to adjust a first sub-frame pixel value in the second sub-frame in response to the first sub-frame pixel value being associated with an edge pixel.

21. The system of claim 20 wherein the image processing unit is configured to adjust the first sub-frame pixel value in the second sub-frame by increasing the first sub-frame pixel value in response to the first sub-frame pixel value being associated with the edge pixel.

22. The system of claim 12 wherein the selected offset comprises a horizontal offset and a vertical offset, wherein the horizontal offset is equal to n pixels where n is an integer, and wherein the vertical offset is equal to m pixels where m is an integer.

23. A system for displaying an image using a display device having a plurality of detective pixels, the system comprising:
    means for selecting a selected offset from one of a plurality of possible offsets between a first sub-frame and a second sub-frame with a lowest number of stuck-on-stuck pixels;
    means for generating the first sub-frame and the second sub-frame using image data for the image, the information associated with the plurality of detective pixels, and the selected offset; and
    means for sequentially displaying the first sub-frame in a first position and displaying the second sub-frame in a second position which is displaced from the first position according to the selected offset.

24. The system of claim 23 wherein the selected offset comprises a horizontal offset and a vertical offset, wherein the horizontal offset is equal to n pixels where n is an integer, and wherein the vertical offset is equal to m pixels where m is an integer.

25. A computer-readable medium storing instructions readable and executable by a computer for causing the computer to perform a method of generating a first sub-frame and a second sub-frame for display at spatially offset positions defined by a selected offset by a display device having a plurality of defective pixels to generate the appearance of an image, comprising:
    determining the selected offset as one of a plurality of possible offsets with a lowest number of stuck-on-stuck pixels caused by the plurality of defective pixels;
    generating the first sub-frame including adjusting a first plurality sub-frame pixel values of the first sub-frame associated with the plurality of defective pixels; and
    generating the second sub-frame including adjusting a second plurality sub-frame pixel values of the second sub-frame associated with the plurality of defective pixels.

26. The computer-readable medium of claim 25 storing instructions readable and executable by the computer for causing the computer to perform the method further comprising:
    identifying the first plurality sub-frame pixel values in accordance with the plurality of defective pixels and the selected offset; and
    identifying the second plurality sub-frame pixel values in accordance with the plurality of defective pixels and the selected offset.

27. The computer-readable medium of claim 25 storing instructions readable and executable by the computer for causing the computer to perform the method further comprising:
    determining a number of stuck-on-stuck pixels for each of the plurality of possible offsets.

28. The computer-readable medium of claim 27 storing instructions readable and executable by the computer for causing the computer to perform the method further comprising:
    determining the selected offset as the one of the plurality of possible offsets with a lowest number of edge pixels in response to at least two of the plurality of possible offsets being associated with the lowest number of stuck-on-stuck pixels.

29. The computer-readable medium of claim 25 wherein the selected offset comprises a horizontal offset and a vertical offset, wherein the horizontal offset is equal to n pixels where n is an integer, and wherein the vertical offset is equal to m pixels where m is an integer.

* * * * *

UNITED STATES PATENT AND TRADEMARK OFFICE
CERTIFICATE OF CORRECTION

PATENT NO. : 7,453,449 B2  Page 1 of 1
APPLICATION NO. : 10/947762
DATED : November 18, 2008
INVENTOR(S) : Robert A. Ulichney et al.

It is certified that error appears in the above-identified patent and that said Letters Patent is hereby corrected as shown below:

In column 15, line 28, in Claim 23, delete "detective" and insert -- defective --, therefor.

In column 15, line 35, in Claim 23, delete "detective" and insert -- defective --, therefor.

Signed and Sealed this

Seventh Day of July, 2009

JOHN DOLL
*Acting Director of the United States Patent and Trademark Office*